(12) United States Patent　　(10) Patent No.:　US 12,687,414 B2
Liu et al.　　(45) Date of Patent:　Jul. 21, 2026

(54) CALIBRATION DEVICE, CALIBRATION SYSTEM AND CALIBRATION METHOD

(71) Applicant: AUTEL INTELLIGENT TECHNOLOGY CORP., LTD., Shenzhen (CN)

(72) Inventors: Lianjun Liu, Shenzhen (CN); Biwang Lai, Shenzhen (CN); Kaikai Zhang, Shenzhen (CN)

(73) Assignee: Autel Intelligent Technology Corp., Ltd., Shenzhen (CN)

( * ) Notice: Subject to any disclaimer, the term of this patent is extended or adjusted under 35 U.S.C. 154(b) by 1021 days.

(21) Appl. No.: 17/645,515

(22) Filed: Dec. 22, 2021

(65) Prior Publication Data

US 2022/0113172 A1　Apr. 14, 2022

Related U.S. Application Data

(63) Continuation of application No. PCT/CN2020/103823, filed on Jul. 23, 2020.

(30) Foreign Application Priority Data

Jul. 23, 2019　(CN) .......................... 201910666973.1

(51) Int. Cl.
　*G01D 18/00*　(2006.01)
　*G01M 17/007*　(2006.01)
(52) U.S. Cl.
　CPC ......... *G01D 18/008* (2013.01); *G01D 18/001* (2021.05); *G01M 17/007* (2013.01)
(58) Field of Classification Search
　CPC . G01D 18/008; G01D 18/001; G01M 17/007; G01S 17/08; G01S 7/4026;
　　　　(Continued)

(56) References Cited

U.S. PATENT DOCUMENTS 6,042,080 A　3/2000　Shepherd et al.
6,809,806 B1　10/2004　Carnevale et al.
(Continued)

FOREIGN PATENT DOCUMENTS

CN　201566562 U　9/2010
CN　104890608 A　9/2015
(Continued)

OTHER PUBLICATIONS

Extended European Search Report dated Jul. 11, 2022; Application. No. 20844720.1.

(Continued)

*Primary Examiner* — Aditya S Bhat
(74) *Attorney, Agent, or Firm* — Arch & Lake LLP; Hao Tan; Shen Wang

(57)　　　ABSTRACT

Related are a calibration device (100), a calibration system, and a calibration method in the technical fields of vehicle maintenance and device calibration. A calibration element (20) is mounted on a main frame (10), the calibration element (20) being used for calibrating a sensor (30) of an advanced driver assistant system of a vehicle (200). When in use, the main frame (10) is positioned in a first preset position in the vicinity of at least one wheel hub of the vehicle (200), and by determining the position to place the main frame (10) on the basis of the position of the wheel hub, a lot of time wasted for scribing measurement is saved, thereby providing a calibration device (100), a calibration system, and a calibration method which are easy to operate with increased work efficiency.

16 Claims, 4 Drawing Sheets

(58) Field of Classification Search
CPC ... G01S 2013/9323; G01S 2013/93271; G01S
2013/93273; G01S 13/931; G01S 7/4086;
G01B 2210/10; H04N 17/002
USPC ........................................................ 702/104
See application file for complete search history.

(56) References Cited

U.S. PATENT DOCUMENTS

| | | | |
|---|---|---|---|
| 10,634,488 B2 * | 4/2020 | Stieff | .................... G01S 7/4972 |
| 11,390,289 B2 * | 7/2022 | Corghi | ................. B60W 50/00 |
| 2014/0022115 A1 | 1/2014 | Borruso | |
| 2019/0101384 A1 | 4/2019 | Zack | |
| 2025/0321328 A1 * | 10/2025 | Liu | ........................ G01S 7/497 |

FOREIGN PATENT DOCUMENTS

| | | | |
|---|---|---|---|
| CN | 107672594 A | 2/2018 |
| CN | 108010090 A | 5/2018 |
| CN | 108267163 A | 7/2018 |
| CN | 108535729 A | 9/2018 |
| CN | 109791045 A | 5/2019 |
| DE | 102013001449 A1 | 3/2014 |

OTHER PUBLICATIONS

International search report of PCT/CN2020/103823 mailed Oct. 9, 2020 with English translation.
EPO Communication dated Feb. 7, 2025; Appln. No. 20 844 720.1.

* cited by examiner

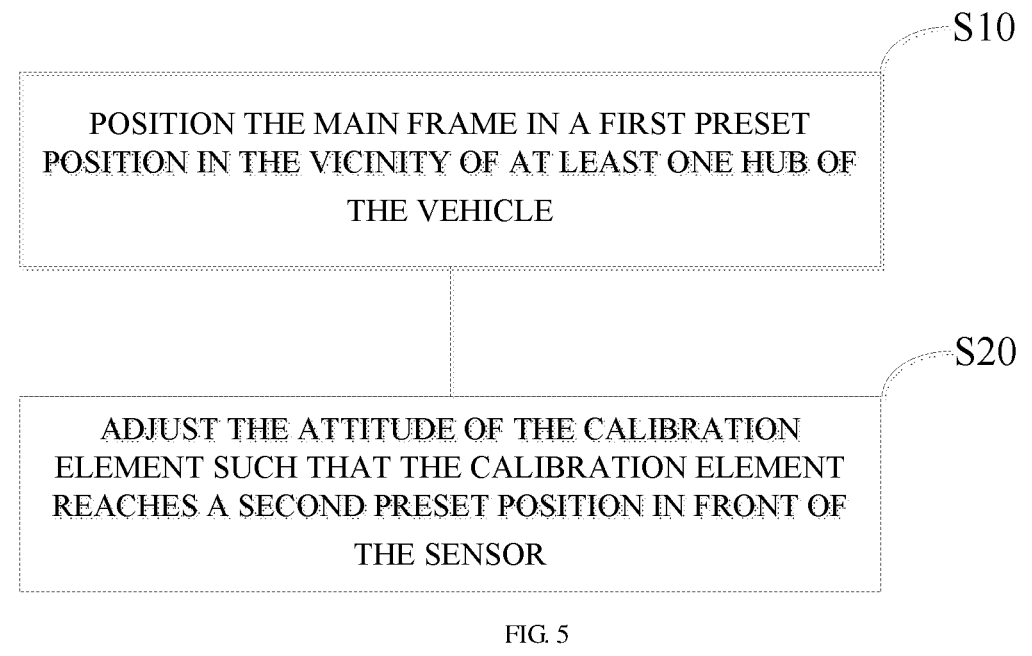

S10

POSITION THE MAIN FRAME IN A FIRST PRESET
POSITION IN THE VICINITY OF AT LEAST ONE HUB OF
THE VEHICLE

S20

ADJUST THE ATTITUDE OF THE CALIBRATION
ELEMENT SUCH THAT THE CALIBRATION ELEMENT
REACHES A SECOND PRESET POSITION IN FRONT OF
THE SENSOR

FIG. 5

CALIBRATION DEVICE, CALIBRATION SYSTEM AND CALIBRATION METHOD

This application claims priority to PCT Application No, PCT/CN2020/103823 filed on Jul. 23, 2020, which claims priority to Chinese Patent Application No. 201910666973.1, entitled "CALIBRATION DEVICE, CALIBRATION SYSTEM AND CALIBRATION METHOD", filed on Jul. 23, 2019 in China Patent Office, the entire contents of which are incorporated herein by reference.

TECHNICAL FIELD

The present application relates to the technical fields of vehicle maintenance and device calibration, and in particular, to a calibration device, a calibration system and a calibration method.

BACKGROUND ART

In the field of vehicle maintenance, before using a calibration device to calibrate an Advanced Driver Assistant System (ADAS) of a vehicle, it is necessary to rectify the calibration device so as to align the calibration device with the vehicle and keep the calibration device perpendicular to a symmetry axis of the vehicle. If the angular deviation between the calibration device and the central axis of the vehicle is large, the calibrated function will have a large deviation or the calibration will be inaccurate, and the calibrated function will cause a safety hazard to the vehicle. The current method for rectifying a calibration device relative to a vehicle has the following defect:

for a current calibration device, the position to place the calibration device is usually found out through measurement by scribing based on some parts of the vehicle, such as the vehicle logo, and this process consumes a lot of time and requires multi-person cooperation.

SUMMARY OF THE INVENTION

In order to solve the above technical problems, embodiments of the present invention provide a calibration device, a calibration system and a calibration method which are easy to operate with increased word efficiency.

In order to solve the above technical problem, the embodiments of the present invention provide the following technical solution:

In a first aspect, a calibration device is provided, and the calibration device includes a main frame and a calibration element; the calibration element is mounted on the main frame; the calibration element is used for calibrating a sensor of an advanced driver assistant system of a vehicle; where when the calibration device is in use, the main frame is positioned in a first preset position in the vicinity of at least one wheel hub of the vehicle.

In some embodiments, the main frame further includes at least one support rod for supporting the calibration element; and when the calibration device is in use, the at least one support rod is positioned in the first preset position in the vicinity of the at least one wheel hub of the vehicle.

In some embodiments, the at least one support rod is provided with a wheel hub bracket mounted thereon, the wheel hub bracket of the at least one support rod being used to be connected to the at least one wheel hub.

In some embodiments, the at least one support rod includes two support rods; and when the calibration device is in use, the two support rods are positioned in the first preset position in the vicinity of two opposite wheel hubs of the vehicle.

In some embodiments, the main frame further includes a cross beam; and the at least one support rod supports the calibration element with the cross beam.

In some embodiments, the main frame further includes a base; and the base supports the at least one support rod.

In some embodiments, the base is provided with sliding wheels to enable the base to slide on the ground.

In some embodiments, the main frame includes a pole and a support, and the support is mounted on the pole and is movable along the pole to adjust a height of the support from the ground; and the calibration element is mounted on the support.

In some embodiments, the main frame further includes a horizontal distance adjusting means for adjusting a horizontal distance of the calibration element relative to a vertical center plane of the vehicle such that the calibration element reaches a second preset position in front of the sensor.

In some embodiments, the horizontal distance adjusting means includes a cross beam and a pipe sleeve; the cross beam is perpendicular to the vertical center plane of the vehicle, and the pipe sleeve sleeves the cross beam and is movable along the cross beam; and one end of the pole is connected to the pipe sleeve.

In some embodiments, the main frame further includes an angle adjusting means for adjusting an angle of the calibration element relative to the vertical center plane of the vehicle such that the calibration element is perpendicular to the vertical center plane of the vehicle.

In some embodiments, the support includes the angle adjusting means, a supporting portion, and a mounting portion; the supporting portion is mounted to the pole, the calibration element is mounted to the mounting portion, and the angle adjusting means is mounted between the supporting portion and the mounting portion; and the angle adjusting means is a universal joint.

In some embodiments, the support includes the angle adjusting means, a supporting portion, and a mounting portion, and the angle adjusting means includes a rotating piece and two rotating joints; the supporting portion is mounted to the pole, the calibration element is mounted to the mounting portion, one of the two rotating joints is connected between the rotating piece and the supporting portion, and the other of the two rotating joints is connected between the rotating piece and the mounting portion; and an axis of rotation of one of the two rotating joints is parallel to the pole, while an axis of rotation of the other of the two rotating joints is perpendicular to the vertical center plane of the vehicle.

In some embodiments, the pole is retractable, and the height of the calibration element is determined based on a degree of retraction of the pole.

In some embodiments, the pole includes a first pole and a second pole, where the second pole sleeves the first pole, and the second pole and the first pole are movable relative to each other along a length direction of the pole so as to extend and retract the pole; where the calibration element is mounted to the first pole, and the first pole is rotatable relative to the second pole to adjust an angle of the calibration element relative to the vertical center plane of the vehicle such that the calibration element is substantially parallel to a cross-section of the vehicle.

In some embodiments, the calibration element includes a calibration board carrying a calibration pattern; where the size of the calibration pattern is related to a distance of the calibration element relative to the sensor.

In some embodiments, the calibration element includes a display on which a calibration pattern is displayed; where the size of the calibration pattern is related to a distance of the calibration element relative to the sensor.

In some embodiments, the calibration device is positioned, in use, in a first preset position in the vicinity of a front wheel hub of the vehicle.

In a second aspect, a calibration system is provided, and the calibration system is used for calibrating an advanced driver assistant system of a vehicle, the calibration system including: a positioning means and the calibration device described above; the positioning means is used to position the main frame to a first preset position in the vicinity of at least one wheel hub of a vehicle such that a sensor of the advanced driver assistant system is calibrated based on the calibration device.

In some embodiments, the positioning means is arranged on the main frame.

In some embodiments, the positioning means is used to abut against the at least one wheel hub such that the main frame is positioned to the first preset position.

In some embodiments, the positioning means is independent of the main frame.

In some embodiments, the positioning means is used to set a positioning mark, and the positioning mark is used for marking the first preset position.

Compared with the prior art, in the calibration device and the calibration system having the calibration device provided by the embodiments of the present invention, by determining the position to place the main frame of the calibration device on the basis of the position of the wheel hub, a lot of time wasted for scribing measurement, thereby providing a calibration method which is easy to operate with increased work efficiency.

In a third aspect, a calibration method based on a calibration system is provided, and the calibration system includes a main frame and a calibration element mounted to the main frame, and the calibration element is used for calibrating a sensor of an advanced driver assistant system of a vehicle; the method includes the following steps:

positioning the main frame in a first preset position in the vicinity of at least one wheel hub of the vehicle; and adjusting the attitude of the calibration element such that the calibration element reaches a second preset position in front of the sensor.

In some embodiments, the main frame includes at least one support rod; and when the main frame is positioned in the first preset position in the vicinity of the at least one wheel hub of the vehicle, the at least one support rod is positioned in the first preset position in the vicinity of the at least one wheel hub of the vehicle.

In some embodiments, when the at least one support rod is positioned in the first preset position, the at least one support rod intersects a centerline of the at least one wheel hub.

In some embodiments, the at least one support rod includes two support rods; and when the at least one support rod is positioned in the first preset position in the vicinity of the at least one wheel hub of the vehicle, the two support rods are positioned in the first preset position in the vicinity of two opposite wheel hubs of the vehicle.

In some embodiments, the main frame further includes a cross beam, the at least one support rod supports the cross beam, and the cross beam supports the calibration element; and when the at least one support rod is positioned in the first preset position in the vicinity of the at least one wheel hub of the vehicle, the cross beam is located above the vehicle.

In some embodiments, the height of the at least one support rod is adjustable to adjust a height difference between the cross beam and the vehicle.

In some embodiments, the calibration system further includes a positioning means; and the main frame is positioned to the first preset position in the vicinity of the at least one wheel hub of the vehicle by means of the positioning means.

In some embodiments, the sensor is located at a front windshield of the vehicle; and the at least one wheel hub is a front wheel hub of the vehicle.

In some embodiments, the sensor is located at a rear windshield of the vehicle; and the at least one wheel hub is a rear wheel hub of the vehicle.

In some embodiments, the adjusting the attitude of the calibration element includes: adjusting a horizontal distance of the calibration element relative to a vertical center plane of the vehicle, adjusting a height of the calibration element from the ground, and adjusting an angle of the calibration element relative to the vertical center plane of the vehicle.

In some embodiments, the attitude of the calibration element is adjusted by a motor.

In a third aspect, a calibration device is provided, including a main frame, a calibration element, and a positioning means;

where the calibration element is mounted to the main frame for calibrating a sensor of an advanced driver assistant system of a vehicle; and the positioning means is mounted to the main frame, and is connectable to at least one wheel hub of the vehicle to position the main frame to a first preset position.

In a fourth aspect, a calibration device is provided, including a main frame, a calibration element, and a positioning means;

where the calibration element is mounted to the main frame for calibrating a sensor of an advanced driver assistant system of a vehicle; and the positioning means is mounted to the main frame, and is connectable to the vehicle to position the main frame to a first preset position.

In a fifth aspect, a calibration device is provided, including a main frame, a calibration element, and a positioning means;

where the calibration element is mounted to the main frame for calibrating a sensor of an advanced driver assistant system of a vehicle; and the positioning means is detachably mounted to the main frame, and is connectable to at least one wheel hub of the vehicle to position the main frame to a first preset position.

Compared with the prior art, in the calibration method based on the calibration system provided by the embodiments of the present invention, by determining the position to place the main frame of the calibration system on the basis of the position of the wheel hub, a lot of time wasted for scribing measurement is saved, thereby providing a calibration method which is easy to operate with increased work efficiency.

BRIEF DESCRIPTION OF THE DRAWINGS

One or more embodiments are illustrated by way of example in the accompanying drawings, and these illustrations are not to be construed as limiting the embodiments. Elements in the figures having the same reference numerals represent like elements, and unless otherwise specified, the figures in the accompanying drawings are not necessarily drawn to scale.

FIG. 5 shows a flowchart of a calibration method provided by another embodiment of the present invention.

DETAILED DESCRIPTION OF THE INVENTION

Figure 1:
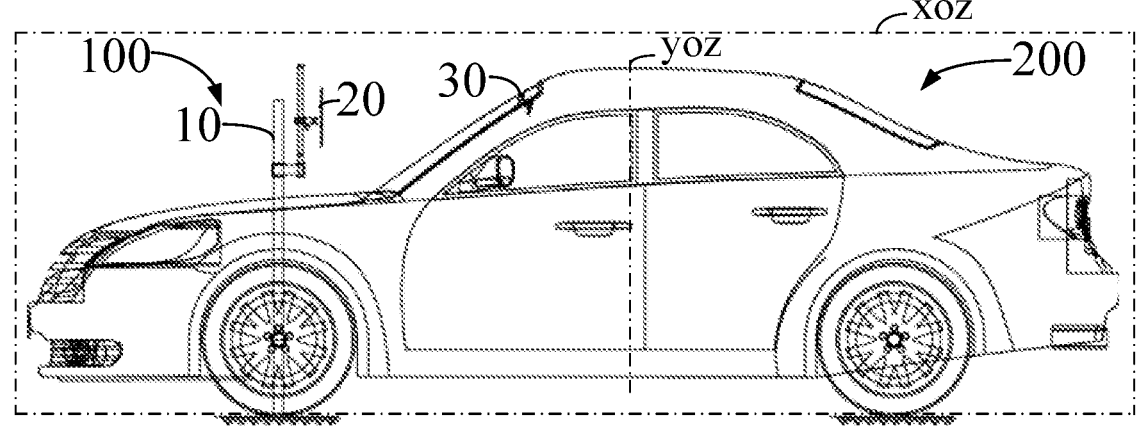
FIG. 1 shows a side view of a calibration device provided by an embodiment of the present invention, with the calibration device assembled with a vehicle to be calibrated.
Figure 2:
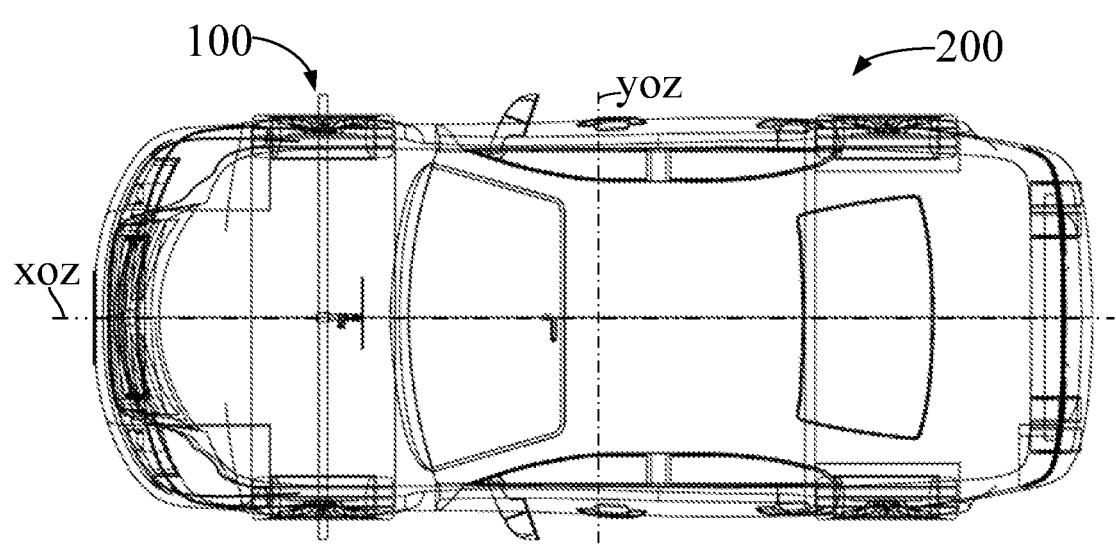
FIG. 2 shows a top view of the calibration device shown in FIG. 1.

To facilitate understanding, the present invention will be described in more detail below with reference to the accompanying drawings and specific embodiments. It should be noted that that when an element is referred to as being "secured" to another element, it may be directly on the other element or intervening elements may be present. When an element is referred to as being "connected" to another element, it may be directly connected to the other element or intervening elements may be present. The terms "vertical", "horizontal", "left", "right", "inner", "outer", and the like are used herein for descriptive purposes only.

Unless defined otherwise, all technical and scientific terms used herein have the same meaning as commonly understood by those of ordinary skill in the art to which this invention belongs. The terminology used herein is for the purpose of describing particular embodiments only and is not intended to be limiting of the invention. As used herein, the term "and/or" includes any and all combinations of one or more of the associated listed items.

Referring to FIGS. 1-4, an embodiment of the present invention provides a calibration device 100, including a main frame 10 and a calibration element 20 mounted on the main frame 10. The calibration element 20 is used for calibrating a sensor 30 of an advanced diver assistant system of a vehicle 200. Among others, the sensor 30 may include a distance sensor, such as a radar; and an image sensors, such as a camera, etc. The calibration element 20 is adapted to the sensor 30 to be calibrated, for example, when the sensor 30 is a radar, the calibration element 20 may be a reflector, an infrared calibration device, etc.; and when the sensor is a camera, the calibration element 20 may be a pattern board, etc.

As the calibration device 100 is used in cooperation with the sensor 30 of the vehicle, an operator places the calibration device 100 in a preset position according to the contents of a calibration operation manual of the sensor 30, and rectifies the calibration device 100 according to the calibration operation manual such that the calibration device 100 is arranged in the preset position relative to the sensor 30, and a calibration process of the sensor 30 may be started. Currently, for most calibration devices 100, the preset position is in front of or behind the vehicle, in which case, as the calibration element of the calibration device 100 is at a relatively large distance from the sensor 30, to accurately determine the relative positions of the calibration element 20 and the sensor 30 is more difficult, i.e., the calibration element cannot be easily positioned at the desired preset position, resulting in a large calibration error.

Thus, the embodiments of the present application provide a calibration device and a calibration method, which improves the accuracy of positioning of the calibration element relative to the sensor and reduces calibration errors.

Figure 3:
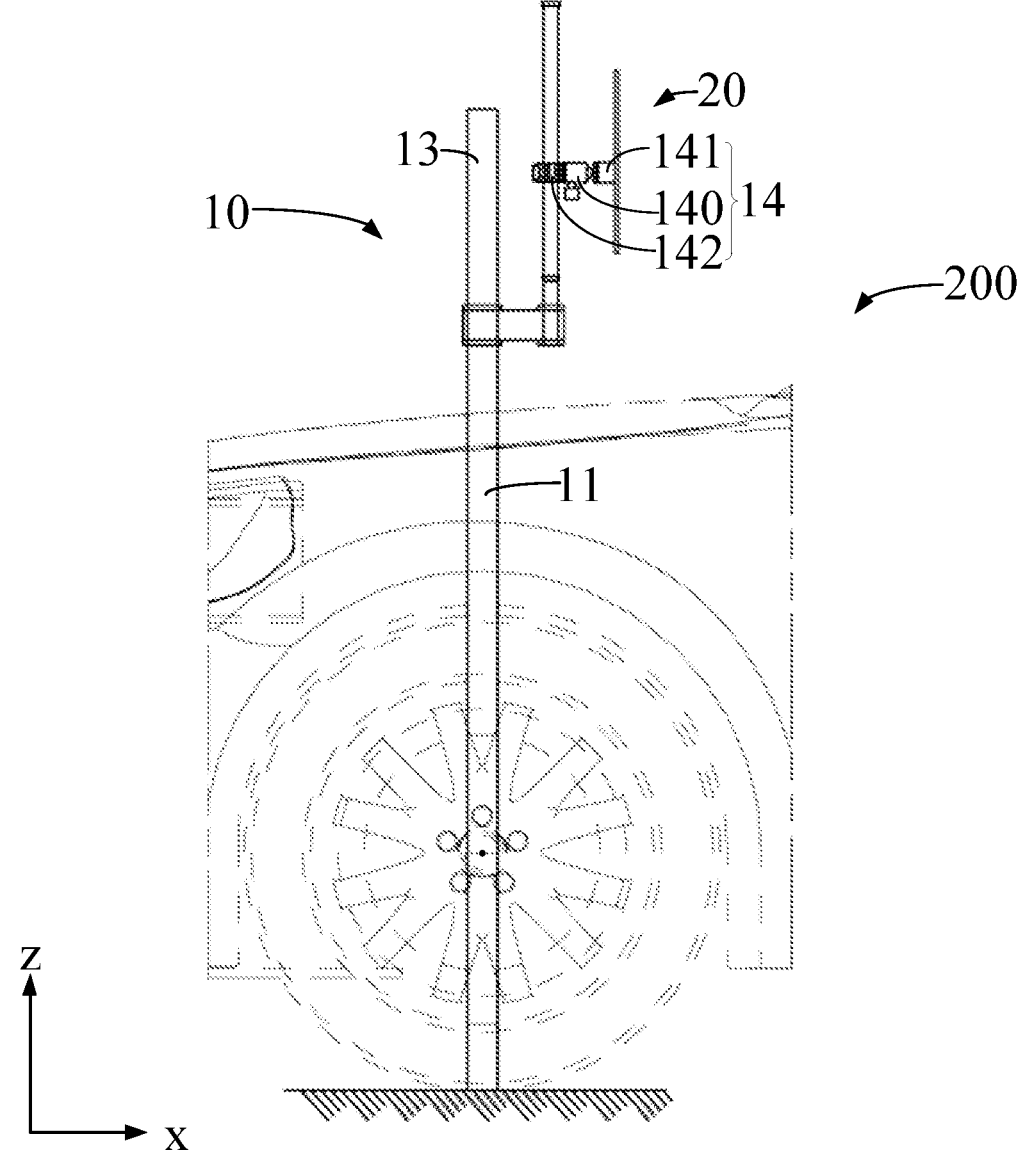
FIG. 3 shows an enlarged partial view of the side view shown in FIG. 1.
Figure 4:
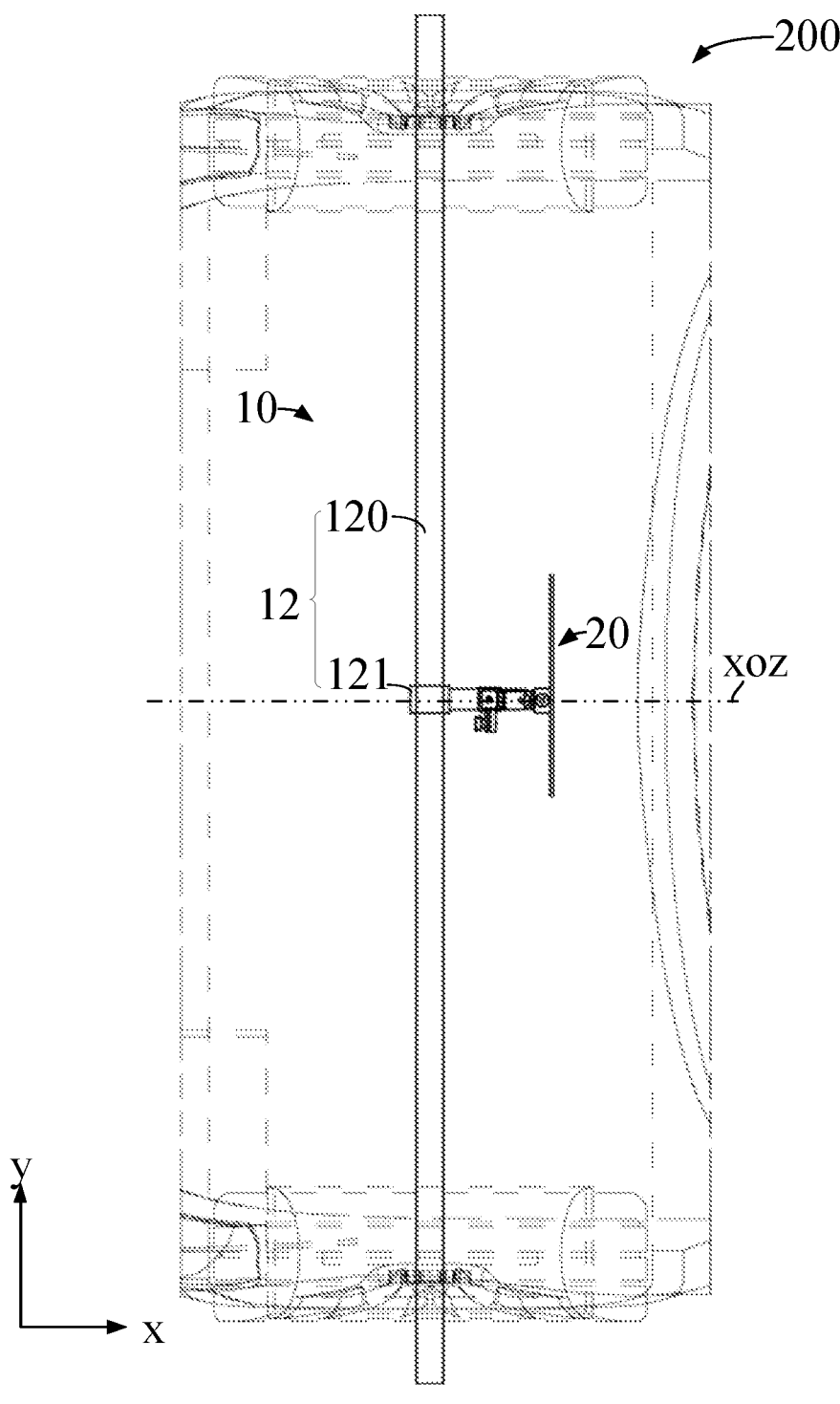
FIG. 4 shows an enlarged partial view of the top view shown in FIG. 2.

In the embodiment described below, in order to facilitate explanation of the relative positional relationship between the components of the calibration device 100 and the vehicle 200, a vertical center plane xoz of the vehicle 200 is taken as a reference. As shown in FIGS. 3 and 4, a horizontal longitudinal direction x and a vertical direction z are both parallel to the vertical center plane xoz, and a horizontal transverse direction y is perpendicular to the vertical center plane xoz, where the vertical direction z is perpendicular to the ground, and the horizontal longitudinal direction x is parallel to the ground. In the embodiments of the present invention, the "ground" refers to a plane where at least three tires of the vehicle 200 are placed, which may be a plane constituted by a lifting frame of a lifting machine, or the floor in a room for storing the vehicle 200.

In the embodiments of the present invention, when the sensor is to be calibrated, the calibration device 100 may be positioned in a first preset position in the vicinity of at least one wheel hub of the vehicle, so that the distance of the calibration device 100 relative to the vehicle is shortened, and the distance of the calibration element relative to the corresponding sensor is in turn shortened, thereby improving the accuracy of positioning of the calibration element. Based on the position of the sensor 30 relative the body of the vehicle, the calibration device 100 is placed in the vicinity of at least one wheel hub closest to the sensor 30. For example, if the sensor is an image sensor arranged in a front windshield for acquiring an image in front of the vehicle, the calibration device may be positioned in the vicinity of at least one front wheel hub.

The position of the calibration device 100 in the vicinity of the wheel hub may be random or preset. The calibration device 100 includes a main frame and a calibration element, where the calibration element is mounted on the main frame. The main frame is positioned in the vicinity of the wheel hub. If the position of the calibration element is adjustable relative to the main frame and the position of the calibration element in space relative to the sensor can be accurately measured by other auxiliary tools, such as a laser range finder, the main frame may be positioned in the vicinity of the wheel hub without accurately determining the relative positional relationship between the main frame and the wheel hub, as long as the calibration element can reach the preset position relative to the sensor. Alternatively, the main frame is positioned in a predetermined position in the vicinity of the hub of wheels, i.e., the positional relationship between the main frame and the wheel hub is preset. The main frame may be attached to the body of the vehicle, or the main frame may be placed beside the body of the vehicle. The preset relative positional relationship between the main frame and the wheel hub may be determined by means of a mechanical structure, or the relative positions of the main frame and the wheel hub may be determined by other auxiliary tools, such as a ruler or a laser range finder. When a mechanical structure is used to determine the preset relative positions of the main frame and the wheel hub, the main frame may be fixed to the body of the vehicle using the mechanical structure, for example, the main frame and the wheel hub are connected by a wheel hub clamp, so as to determine the manner of connection of the main frame and the wheel hub. Alternatively, the main frame may be arranged outside the body of the vehicle with a mechanical structure at a certain distance from the wheel hub, for example, the main frame may be provided with a mechanical structure abutting against the wheel hub, and it may be determined that the main frame is located in a line formed by connecting wheel hub center points of two wheel hubs on both sides of the body of the vehicle (namely, left and right of the body of the vehicle) via the mechanical structure, so that the position of the main frame relative to the body of the vehicle can be accurately determined, and then the position of the calibration element relative to the sensor can be further determined. Among others, the vicinity of a wheel hub includes a spherical space with the wheel hub as the center and a certain preset length as the radius, and any point in the space can be understood to be the vicinity of the wheel hub, including the ground, the body of the vehicle, etc. In other embodiments of the present application, the preset position is not limited to the vicinity of the wheel hub, but also may be in the middle of the body of the vehicle, i.e., at a position between the front and rear wheels on the same side, or at a position in front of or behind the vehicle, or at a position on the top or bottom of the vehicle.

The mechanical structure in this application may also be understood as a positioning means. The positioning means may be fixedly or detachably mounted to the main frame. For the case where the positioning means is detachably mounted to the main frame, the positioning means may be removed after the main frame is positioned to the first preset position, thereby preventing the movement of the main frame from being affected. Alternatively, the positioning means may be mounted to the main frame at various angles, the positioning means may assist in positioning the main frame to different positions relative to the vehicle at different angles relative to the main frame, thereby allowing different calibration elements to be mounted on the main frame to calibrate different systems of the vehicle, or the calibration elements on the main frame may calibrate the same system at different positions.

In some embodiments, the position of the calibration element relative to the main frame is not adjustable, i.e., when the position of the main frame is in a preset position, the calibration element is in the preset position relative to the sensor, and this is suitable for calibrating a sensor in a specific position.

In some embodiments, the position of the calibration element relative to the main frame is adjustable, and the calibration element may be positioned to a preset position relative to the corresponding sensor by adjusting the position of the calibration element relative to the main frame. In this case, the position of the main frame relative to the wheel hub may be preset or random. If the position of the main frame relative to the wheel hub is preset, the calibration element may be positioned to a preset position by adjusting the position of the calibration element relative to the main frame; and if the position of the main frame relative to the wheel hub is random, the calibration element may be positioned to the preset position by adjusting the position of the calibration element relative to a certain position of the body of the vehicle, for example the position where the sensor is located. The calibration element may be aligned to a position on the body of the vehicle using auxiliary tools, such as a ruler or a laser range finder, etc. Optionally, the calibration element is movable relative to the main frame in at least one spatial direction; for example, the calibration element moves along the y-axis to adjust a horizontal lateral distance of the calibration element relative to the sensor; the calibration element moves along the x-axis to adjust a horizontal longitudinal distance of the calibration element relative to the sensor; and the calibration element moves along the z-axis to adjust a height of the calibration element relative to the sensor. Finally, the calibration element is aligned with the sensor, i.e., the calibration element is located in a second preset position.

In some embodiments, it needs to adjust the position of the calibration device relative to the vehicle, i.e., to rectify the calibration device such that the calibration element of the calibration device is parallel to the yoz plane and perpendicular to the ground. Specifically, the position of a support frame relative to the vehicle may be adjusted, i.e., the support frame may be rectified before the calibration element is positioned to the second preset position; or, the position of the calibration device relative to the vehicle may be adjusted, i.e., the calibration device may be rectified after the calibration element is positioned to the second preset position. The calibration device may be provided with an angle adjusting means for precisely adjusting an angle of the support frame or the calibration element relative to the yoz plane or the ground. The angle adjusting means may be arranged on the support frame to adjust the angle of the support frame relative to the yoz plane or the ground, and to ensure that the calibration element is parallel to the yoz plane and perpendicular to the ground after the angle of the support frame is adjusted. Alternatively, the angle adjusting means may be arranged between the calibration element and the support frame, for example, a support is provided on the support frame for supporting the calibration element, and the support may serve to adjust the angle, i.e., the support may be understood as the angle adjusting means. There may be one or more angle adjusting means, if there are a plurality of angle adjusting means, each angle adjusting means may adjust the angle of the calibration element in one plane; and if there is one angle adjusting means, the angle adjustment means may adjust the angle of the calibration element in at least two planes. It is also possible to use multiple rectification methods and auxiliary tools in the methods, so that the angle may be precisely adjusted, and the rectification methods are not limited herein.

After the calibration element has been positioned in the preset position and has been rectified relative to the vehicle, it can be replaced or changed depending on the sensor to be calibrated. For example, an image sensor needs to be calibrated with at least two calibration patterns, then the calibration element may be adapted to the calibration of the image sensor by changing the calibration patterns, or if both an image sensor and a radar need to be calibrated at the same place, calibration patterns or a radar calibration element may be replaced depending on the sensor to be calibrated. A calibration element corresponding to the image sensor may be a pattern board with changeable calibration patterns, and different calibration patterns are adsorbed to the pattern board; or, it may be an electronic display for displaying a calibration pattern.

In some embodiments, if the calibration element corresponding to the image sensor is an electronic display device, the calibration element may be further provided with other devices, such as an electronic ranging device, to determine the distance between the calibration element and the image sensor, and the calibration pattern may be sized to adapt to the calibration of the image sensor according to the relative distance between the calibration element and the image sensor. In this case, as the calibration pattern may be sized, the relative distance between the calibration device and the vehicle may not be strictly defined, i.e., the calibration device may be located in an area in the vicinity of the vehicle, i.e., in the vicinity of at least one wheel hub, to calibrate the image sensor, as long as the calibration element is parallel to the yoz plane and perpendicular to the ground.

The following describes some embodiments of the calibration device, and it is to be noted that the following is only exemplary and that other calibration devices satisfying at least one of the above situations fall within the scope of the present application.

In some embodiments, a main frame 10 includes at least one support rod 11, a horizontal distance adjusting means 12, a pole 13, and a support 14.

The at least one support rod 11 is used for supporting the horizontal distance adjusting means 12, the pole 13, the support 14, and the calibration element 20. It will be appreciated that any of the horizontal distance adjusting means 12, the pole 13 and the support 14 may be omitted depending on the actual conditions.

When the calibration device 100 is in use, the at least one support rod 11 is positioned in the first preset position in the vicinity of the at least one wheel hub of the vehicle 200. Any one of the at least one support rod 11 extends in the vertical direction z, and in some embodiments, the height of the at least one support rod 11 may be adjusted so as to adjust the height of the calibration element 20.

In some embodiments, The at least one support rod 11 is provided with a wheel hub bracket mounted thereon, and the wheel hub bracket (not shown) of the at least one support rod 11 is used to be connected to the at least one wheel hub, so that the at least one support rod 11 can be accurately positioned to and keeps fixed relative to the at least one wheel hub.

In some embodiments, the at least one support rod 11 includes two support rods 11, which are opposed to each other. When the calibration device 100 is in use, the two support rods 11 are positioned in the first preset position in the vicinity of two opposite wheel hubs of the vehicle 200.

In some embodiments, the main frame 10 further includes a base (not shown). The base supports the at least one support rod 11. In other embodiments, the at least one support pole 11 is fixedly mounted to the ground. The base is provided with sliding wheels to enable the base to slide on the ground.

The horizontal distance adjusting means is used for adjusting a horizontal distance of the calibration element 20 relative to the vertical center plane xoz of the vehicle 200 such that the calibration element 20 reaches a second preset position in front of the sensor 30. The horizontal distance adjusting means 12 includes a cross beam 120 and a pipe sleeve 121.

The cross beam 120 extends along the horizontal transverse direction y and is jointly supported by the at least one supporting rod 11, and the cross beam 120 supports the pole 13, the support 14 and the calibration element 20. In some embodiments, the two support rods 11 are connected to both ends of the cross beam 12, respectively, and both ends of the cross beam 120 are adjustable in length so that the distance of the two support rods 11, and thus the distance between the two support rods 11 and the two opposing wheel hubs of the vehicle 200, are changed.

The cross beam 120 is perpendicular to the vertical center plane xoz, and the pipe sleeve 122 sleeves the cross beam 120 and is movable along the cross beam 12.

In some embodiments, both the cross beam 120 and the pipe sleeve 121 are square in cross-section so that the pole 13 can only move along the cross beam 120 without rotating. It will be appreciated that the cross-sections of the cross beam 120 and the pipe sleeve 121 may have other shapes, such as triangular, elliptical, etc. as long as the cross-sections of the cross beam 120 and the pipe sleeve 121 are non-circular, depending on the actual conditions.

In some embodiments, the pipe sleeve 121 is moved along the cross beam 120 by a motor. It will be appreciated that depending on the actual conditions, the sleeve 121 may also be manually driven to move along the cross beam 120.

In other embodiments, the horizontal distance adjusting means 12 includes a cross beam 120 and two clamps (not shown). The two opposite sides of the cross beam 120 are provided with two sliding grooves (not shown) extending in the horizontal transverse direction y, the two clamps are opposite to each other and clamp the transverse beam 12, and the two clamps are accommodated in the two sliding grooves.

One end of the pole 13 is connected to the pipe sleeve 121. The pole 13 extends along the vertical direction z, and the pole 13 supports the calibration element 20 and the support 14.

The support 14 is mounted on the pole 13, and is movable along the pole 13 so as to adjust the height of the support 14 relative to the ground. In some embodiments, the support 14 sleeves the pole 13. In some other embodiments, The two opposite sides of the pole 13 are provided with two sliding grooves extending in the vertical direction z, the support 14 is provided with two clamps arranged opposite to each other, the two clamps clamp the pole 13, and the two clamps are accommodated in the two sliding grooves.

In some embodiments, both the pole 13 and the support 14 are square in cross-section so that the support 14 can only move along the pole 13 without rotating. It will be appreciated that the cross-sections of the pole 13 and the support 14 may have other shapes, such as triangular, elliptical, etc. as long as the cross-sections of the pole 13 and the support 14 are non-circular, depending on the actual conditions.

In some embodiments, the support 14 is moved along the pole 13 by a motor. It will be appreciated that depending on the actual conditions, the support 14 may also be manually driven to move along the pole 13.

The calibration element 20 is mounted on the support 14. The support 14 includes an angle adjusting means 140, a supporting portion 141, and a mounting portion 142.

The angle adjusting means 140 is used for adjusting an angle of the calibration element 20 relative to the vertical center plane xoz such that the calibration element 20 is perpendicular to the vertical center plane xoz.

The supporting portion 141 is mounted to the pole 13, the calibration element 20 is mounted to the mounting portion 142, and the angle adjusting means 140 is mounted between the supporting portion 141 and the mounting portion 142.

In some embodiments, the angle adjusting means 140 is a universal joint.

In some other embodiments, the angle adjusting means 140 includes a rotating piece (not shown) and two rotating joints (not shown). One of the two rotating joints is connected between the rotating piece and the supporting portion 141, and the other is connected between the rotating piece and the mounting portion 142. An axis of rotation of one of the two rotating joints is parallel to the pole 13, while an axis of rotation of the other is perpendicular to the vertical center plane xoz of the vehicle.

It will be appreciated that depending on the actual conditions, the adjusting the height from the ground and the angle to the vertical center plane xoz of the calibration element 20 is not limited to the manner described above.

In some other embodiments, the pole 13 is retractable, and the height of the calibration element 20 is determined based on a degree of retraction of the pole 13. Specifically, the pole 13 includes a first pole (not shown) and a second pole (not shown), where the second pole sleeves the first pole, and the second pole and the first pole are movable relative to each other along a length direction of the pole so as to extend and retract the pole 13, where the calibration element 20 is mounted to the first pole, and the first pole is rotatable relative to the second pole to adjust an angle of the calibration element 20 relative to the vertical center plane xoz such that the calibration element 20 is substantially parallel to a cross-section xoz of the vehicle 200, a cross-section yoz of the vehicle is perpendicular to the vertical center plane xoz, and the cross-section yoz of the vehicle 200 is perpendicular to the ground.

In some embodiments, the calibration element 20 includes a calibration board carrying a calibration pattern, where the size of the calibration pattern is related to a distance of the calibration element 20 relative to the sensor 30.

In some other embodiments, the calibration element 20 includes a display on which a calibration pattern is displayed, where the size of the calibration pattern is related to a distance of the calibration element 20 relative to the sensor 30.

In some embodiments, the calibration device 100 is positioned, in use, in a first preset position in the vicinity of a front wheel hub of the vehicle 200.

It will be appreciated that the sensor 30 is located on the side of the front windshield, but according to the actual conditions, in the case where the sensor 30 is located on the side of the rear windshield, the calibration device 100 may, in use, be located in a first preset position in the vicinity of a rear wheel hub of the vehicle 200.

Another embodiment of the present invention provides a calibration system (not shown) for calibrating an advanced diver assistant system of a vehicle 200. The calibration system includes the calibration device 100 as described above and a positioning means.

The positioning means is used to position the main frame 10 to the first preset position in the vicinity of at least one wheel hub of the vehicle 200 such that the sensor 30 of the advanced driver assistant system is calibrated based on the calibration device 100.

In some embodiments, the positioning means is arranged on the main frame. The positioning means is used to abut against the at least one wheel hub such that the main frame 10 is positioned to the first preset position. The positioning means may be a wheel hub clip.

In some other embodiments, the positioning means is independent of the main frame 10. The positioning means is used to set a positioning mark, and the positioning mark is used for marking the first preset position. The positioning means includes a ruler, a laser, etc.

It should be noted that the positioning means is independent of the main frame 10, i.e., the two are not directly connected and may be moved separately.

Compared with the prior art, in the calibration device 100 and the calibration system having the calibration device 100 provided by the embodiments of the present invention, since the position of the wheel hub of the vehicle 200 is definite, the position to place the main frame 10 of the calibration device 100 may be determined on the basis of the position of the wheel hub, so that a lot of time wasted for scribing measurement is saved, thereby providing a calibration device 100 and a calibration system which are easy to operate with increased work efficiency.

Referring to FIG. 5, another embodiment of the present invention provides a calibration method based on the calibration system provided by the previous embodiment.

The method includes the following steps:

Step S10, the main frame is positioned in a first preset position in the vicinity of at least one wheel hub of the vehicle; and step S20, the attitude of the calibration element is adjusted such that the calibration element reaches a second preset position in front of the sensor.

In the calibration method, since the position of the wheel hub of the vehicle is definite, the position to place the main frame may be determined on the basis of the position of the wheel hub, so that a lot of time wasted for scribing measurement is saved, thereby providing a calibration method which is easy to operate with increased work efficiency.

In step S10, when the main frame is positioned in the first preset position in the vicinity of the at least one wheel hub of the vehicle, the at least one support rod is positioned in the first preset position in the vicinity of the at least one wheel hub of the vehicle. The support rod is used for supporting the main frame on the ground, that is, the support rod is a fulcrum of the main frame.

In some embodiments, when the at least one support rod is positioned in the first preset position, the at least one support rod intersects a centerline of the at least one wheel hub such that the position of the support rod is accurate.

In some embodiments, when the at least one support rod is positioned in the first preset position in the vicinity of the at least one wheel hub, the two support rods are positioned in the first preset position in the vicinity of two opposite wheel hubs of the vehicle. When support rods are used for positioning, the support rods are prone to rotate about their own axes, and the use of two support rods for positioning jointly ensures the angle of the main frame to be accurate.

In some embodiments, when the at least one support rod is positioned in the first preset position in the vicinity of the at least one wheel hub, the cross beam is located above the vehicle, so that the calibration element supported by the cross beam is at a short distance from the sensor, facilitating calibration.

In some embodiments, the height of the at least one support rod is adjustable to adjust a height difference between the cross beam and the vehicle, so that the cross beam may be as close as possible to the vehicle to provide a vertical lift allowance for the calibration element.

In some embodiments, the main frame is positioned to the first preset position in the vicinity of the at least one wheel hub of the vehicle by means of the positioning means, so that the positioning accuracy is increased while the connection reliability is improved.

In some embodiments, the sensor is located at a front windshield of the vehicle, and the at least one wheel hub is a front wheel hub of the vehicle.

In some other embodiments, the sensor is located at a rear windshield of the vehicle, and the at least one wheel hub is a rear wheel hub of the vehicle.

In some embodiments, the adjusting the attitude of the calibration element includes: adjusting a horizontal distance of the calibration element relative to a vertical center plane, adjusting a height of the calibration element from the ground, and adjusting an angle of the calibration element relative to the vertical center plane.

In some embodiments, the attitude of the calibration element is adjusted by a motor, and a control panel for operating the motor may be disposed on the main frame, or a remote controller for remotely operating the motor may be provided to adjust the attitude of the main frame more conveniently.

Compared with the prior art, the embodiment of the present invention provides a calibration method based on a calibration system, the main frame is positioned in a first preset position in the vicinity of at least one wheel hub of a vehicle, and since the position of the wheel hub of the vehicle is definite, the position to place the main frame of the calibration system may be determined on the basis of the position of the wheel hub, so that a lot of time wasted for scribing measurement is saved, thereby providing a calibration method which is easy to operate with increased work efficiency.

Finally, it should be noted that: the above embodiments are merely illustrative of the technical solution of the present invention, and are not limiting thereto. Combinations of features in the above embodiments or between different embodiments are also possible within the spirit of the invention, the steps may be implemented in any order, and many other variations of different aspects of the invention as described above are possible, which are not provided in detail for the sake of brevity. Although the present invention has been described in detail with reference to the foregoing embodiments, those skilled in the art will appreciate that: the technical solutions disclosed in the above-mentioned embodiments may still be modified or some of the technical features thereof may be replaced by equivalents; however, these modifications do not depart from the spirit and scope of the embodiments of the present invention.

The invention claimed is:

1. A calibration system for calibrating an advanced driver assistant system of a vehicle, comprising:

a main frame, a calibration element, and a positioning means, wherein the calibration element is mounted on the main frame, the calibration element is used for calibrating a sensor of an advanced driver assistant system of a vehicle, the positioning means is mounted to the main frame, and is abutting against the wheel hub of the vehicle, and the main frame is located in a line formed by connecting wheel hub center points of two wheel hubs on both sides of the body of the vehicle via the positioning means.

2. The calibration system according to claim 1, wherein the positioning means is connected to at least one wheel hub of the vehicle to position the main frame to the first preset position relative to the vehicle, or the positioning means is connected to the vicinity of the at least one wheel hub of the vehicle to position the main frame to the first preset position relative to the vehicle.

3. The calibration system according to claim 2, wherein the vicinity of the at least one wheel hub of the vehicle comprises a body of the vehicle or ground which stands the vehicle.

4. The calibration system according to claim 1, wherein the main frame comprises a pole and a support, and the support is mounted on the pole and is movable along the pole to adjust a height of the support from the ground; and the calibration element is mounted on the support.

5. The calibration system according to claim 4, wherein the support further comprises an angle adjusting means for adjusting an angle of the calibration element relative to a vertical center plane of the vehicle such that the calibration element is perpendicular to the vertical center plane of the vehicle.

6. The calibration system according to claim 5, wherein the angle adjusting means is a universal joint.

7. The calibration device according to claim 1, wherein the pole is retractable, and the height of the calibration element is determined based on a degree of retraction of the pole.

8. The calibration device according to claim 7, wherein the pole comprises a first pole and a second pole, wherein the second pole sleeves the first pole, and the second pole and the first pole are movable relative to each other along a length direction of the pole so as to extend and retract the pole;

wherein the calibration element is mounted to the first pole, and the first pole is rotatable relative to the second pole to adjust an angle of the calibration element relative to the vertical center plane of the vehicle such that the calibration element is substantially parallel to a cross-section of the vehicle.

9. The calibration device according to claim 1, wherein the calibration element comprises a display on which a calibration pattern is displayed;

wherein the size of the calibration pattern is related to a distance of the calibration element relative to the sensor.

10. A calibration method based on a calibration system, the calibration system comprising:

a main frame, a calibration element mounted to the main frame, and a positioning means mounted to the main frame, wherein the calibration element is used for calibrating a sensor of an advanced driver assistant system of a vehicle, wherein the method comprises the following steps:

connecting the positioning means to abut against the wheel hub of the vehicle, so that the main frame locates in a line formed by connecting wheel hub center points of two wheel hubs on both sides of the body of the vehicle via the positioning means; and adjusting the position of the calibration element such that the calibration element reaches a second preset position in front of the sensor.

11. The calibration method according to claim 10, wherein connecting the positioning means to at least a part of the vehicle comprises:

connecting the positioning means to at least one wheel hub of the vehicle; or connecting to the vicinity of the at least one wheel hub of the vehicle.

12. The calibration method according to claim 11, wherein the vicinity of the at least one wheel hub of the vehicle comprises a body of the vehicle or ground which stands the vehicle.

13. The calibration method according to claim 10, wherein adjusting the position of the calibration element such that the calibration element reaches the second preset position in front of the sensor comprises:

adjusting a height of the calibration element such that the calibration element reaches the second preset position in front of the sensor.

14. The calibration method according to claim 10, wherein adjusting the position of the calibration element such that the calibration element reaches the second preset position in front of the sensor comprises:

adjusting a horizontal distance of the calibration element relative to a vertical center plane of the vehicle.

15. The calibration method according to claim 10, wherein adjusting the position of the calibration element such that the calibration element reaches the second preset position in front of the sensor comprises:

adjusting an angle of the calibration element relative to the vertical center plane of the vehicle.

16. The calibration system according to claim 4, wherein the support comprises a horizontal distance adjusting means for adjusting a horizontal distance of the calibration element relative to a vertical center plane of the vehicle such that the calibration element reaches a second preset position relative to the sensor.

\* \* \* \* \*